UNITED STATES PATENT OFFICE.

MORRIS S. GREENBAUM, OF CHICAGO, ILLINOIS.

MANUFACTURE OF NUTRITIVE MATERIAL FOR BOTH ANIMAL AND VEGETABLE LIFE.

1,020,091. Specification of Letters Patent. Patented Mar. 12, 1912.

No Drawing. Application filed May 26, 1911. Serial No. 629,665.

*To all whom it may concern:*

Be it known that I, MORRIS S. GREENBAUM, a citizen of the United States, residing in the city of Chicago, in the county of Cook and State of Illinois, have invented certain new and useful Improvements in the Manufacture of Nutritive Material for Both Animal and Vegetable Life; and I do hereby declare that the following is a full, clear, and exact description of the invention, which will enable others skilled in the art to which it appertains to make and use the same.

This invention relates to the process of utilizing distillery slop in the manufacture of feed rich in nutrition, and fertilizer, and in such shape that it may be readily handled and transported.

The residue or by-product left after the distillation of alcohol from fermented mashes in the manufacture of spirits, whisky, alcohol, etc., is known as "distillery slop," and contains a large amount of nutritious substance. The solid particles of this nutritious substance have commonly been separated out from the distillery slop and used for feeding purposes; the more liquid portion of the nutritive element in this slop by reason of its being in solution or in fine mechanical suspension in a watery medium, thus increasing the mechanical difficulty of separating it out from the fluid with which it is mixed has largely been wasted, and to a less extent by a common process of evaporation a certain percentage of the suspended or dissolved nutritive element has been separated out of the fluid.

It is the intent of this invention to utilize the entire slop, both that portion which may be readily and mechanically separated, as well as the nutritive element in suspension or solution which is more commonly wasted, all in the manufacture of nutritive material for both animal and vegetable life. The nutritive material which is produced being a combined mixture which is composed only partially of the nutritive elements contained in the distillery slop.

My process is to utilize the distillery slop in one of three ways: (*a*) I use the distillery slop in the form in which it exists as it first comes from the still without separating its more solid constituents; (*b*) I separate the distillery slop by common and well known mechanical processes, taking out the readily separable portions and utilizing only in the below described processes the thin and watery slop containing nutritious elements, a portion of which nutritive matters is in suspension and solution. (*c*) I use the same separation and process as in the method "*b*" just described, with the exception that later on in the process, the more solid constituents of the distillery slop which have been separated out are added to, and made a part of, the resulting mixture. This liquid or fluid distillery slop, either in its original form, or when thus separated, as described, is reduced to a denser consistency by evaporating, boiling or straining, or any mechanical process, or by adding thereto any material of nutritive value, according as the product is to be used as a fertilizer or as a feed for animals. When thus reduced to the denser form this slop is of a syrupy consistency and then is mixed with bran, corn meal, cereal products, or by-products, or derivatives, or other matters of nutritive or fertilizing value, according as the resulting product is to be used for fertilizer or for feed, to the extent of creating a mixture that is less fluid than was originally that portion of the distillery slop which was changed to the syrupy consistency, and at the time of this admixture, if the more substantial portions of the distillery slop have been separated from the original slop and are to be included in this mixture, such separated portion is now admixed, as described in clause "*c*" above, thus making a mixture of (1) the bran, corn meal, cereals, or other nutritive material, above described, (2) the fluid portion of the distillery slop, reduced to a syrupy consistency, and (3) the more substantial portion of the distillery slop; although, as stated this admixture is also made (I) without first separating out the more substantial portion of the original distillery slop (clause *a* above) and also made (II) without utilizing at all the more substantial portion of the distillery slop (clause *b* above). In each and every of these processes a portion of the treated distillery slop is in a moist and syrupy state when incorporated into the mixture. When thus thoroughly mixed the entire mass, regardless of which of the three methods are used, is moist and of a more or less viscid consistency, and it is boiled, or thoroughly mixed without boiling, by means of which process, the more solid portions of the mixture are thoroughly impregnated with the fluid or liquid portions, and by means of this process, the entire resultant mass is rendered more homogeneous than would otherwise be possible. After being thus thoroughly admixed or homogenized, either with or without boiling, the entire resulting mass is subjected to an evaporating process, of which there are a number of methods in common use, by means of which process the excess moisture is driven off. The product is then ready for shipment and for use.

In so far as I am aware no process has been employed by any one else whereby foreign material other than slop or its derivatives was mixed with the slop before evaporation or other process by which the excess moisture is driven off. Nor am I aware of any process having been employed where the amalgamation of the unseparated slop, or thin portion of the separated slop, has taken place with foreign nutritive material, or with both foreign nutritive material and the thick slop that has previously been separated and dried, and after such admixture and amalgamation the entire resultant has been evaporated or dried by other process. Heretofore, any mixture with foreign nutritive material which has taken place has been purely mechanical after the slop had progressed to the dry state, whereas by my process the admixture after the addition of the foreign nutritive material is still moist and of a more or less viscid consistency, so that the foreign nutritive material is thoroughly impregnated with the fluid portions of the slop and thus homogenized with it before it is dried, giving a much more desirable result than the mere mechanical mixture. The slop thus prepared becomes a nutritive material for either vegetable or animal life, the foreign nutritive material which is combined with the slop being of the various well known kinds chosen according to the use to which the resultant nutritive material is to be put, as, for example, the various qualities and grades of feed or rations, and fertilizer for the various kinds of soil and of crops. In every kind of product, however, the homogenizing of the mixture before drying, as above explained, is the novelty claimed.

I claim:

1. The process of manufacturing a nutritive material by adding to any nutritive material, including cereals in their original or altered state and cereal by-products, the distillery slop, which has been reduced to a syrupy consistency by any of the common or well known mechanical or chemical processes, and then thoroughly mixing the same together, and boiling same, thoroughly impregnating the substantial portion of the mixture with the nutritive elements of the fluid portion of the mixture, and after the said mixture, which is still in a moist state, has been thus rendered more or less homogeneous, the excess moisture is driven off by any of the common means therefor.

2. The process of manufacturing nutritive material by adding to any nutritive material, including cereals in their original or altered state and cereal by-products, the thin portion of the distillery slop which has been reduced to a syrupy consistency by any of the common or well known mechanical or chemical processes, and then thoroughly mixing the same together, and boiling same, thoroughly impregnating the substantial portion of the mixture with the nutritive elements of the fluid portion of the mixture, and after the said mixture, which is still in a moist state, has been thus rendered more or less homogeneous, the excess moisture is driven off by any of the common means therefor.

3. The process of manufacturing a nutritive material by adding to any nutritive material, including cereals in their original or altered state and cereal by-products, the thin portion of the distillery slop which has been reduced to a syrupy consistency by any of the common or well known mechanical or chemical processes, and then adding to that mixture the separated more substantial portion of the distillery slop; in any convenient or desired order of procedure and then thoroughly mixing the same together, and boiling same, thoroughly impregnating the substantial portion of the mixture with the nutritive elements of the fluid portion of the mixture, and after the said mixture, which is still in a moist state, has been rendered more or less homogeneous, the excess moisture is driven off by any of the common means therefor.

4. The process of manufacturing a nutritive material by adding to any nutritive material, including cereals in their original or altered state and cereal by-products, the thin portion of the distillery slop which has been reduced to a syrupy consistency by any of the common or well known mechanical or chemical processes, and then adding to that mixture the separated more substantial portion of the distillery slop; in any convenient or desired order of procedure, and then thoroughly mixing the same together, and thoroughly impregnating the substantial portion of the mixture with the nutritive elements of the fluid portion of the mixture, and after the said mixture, which is still in a moist state, has been rendered more or less homogeneous, the excess moisture is driven off by any of the common means therefor.

In testimony whereof, I have affixed my signature in the presence of two witnesses.

MORRIS S. GREENBAUM.

Witnesses:
ABRAHAM N. GATZERB,
L. C. BEILMAN.

Copies of this patent may be obtained for five cents each, by addressing the "Commissioner of Patents, Washington, D. C."